United States Patent [19]

Cunha

[11] 4,137,848
[45] Feb. 6, 1979

[54] ROCKET ENGINE MOUNT

[75] Inventor: Daniel Cunha, Mt. View, Calif.

[73] Assignee: The United States of America as represented by the Secretary of the Navy, Washington, D.C.

[21] Appl. No.: 628,869

[22] Filed: Nov. 5, 1975

[51] Int. Cl.² .................. F42B 15/00; F42B 15/20
[52] U.S. Cl. ................................... 102/49.5
[58] Field of Search ................ 102/49.4, 49.5; 89/1 B

[56] References Cited
U.S. PATENT DOCUMENTS

| | | | |
|---|---|---|---|
| 3,260,204 | 7/1966 | Wilkey, Jr. | 102/49.5 |
| 3,453,960 | 7/1969 | Qualls | 102/49.5 |
| 3,486,410 | 12/1969 | Drexelius | 89/1 B |
| 3,534,686 | 11/1970 | Watson | 102/49.5 |

Primary Examiner—Verlin R. Pendegrass
Attorney, Agent, or Firm—R. S. Sciascia; Charles D. B. Curry; Francis I. Gray

[57] ABSTRACT

An engine mount to position a rocket engine within a missile stage and to release the engine upon burn-out. A separation ring comprising a bracket portion and a shroud portion encircles the engine. The bracket is located approximately mid-length of the engine and wound thereon to engage the engine-circling sheath having a grooved and unsymmetrically weakened cross-section. The shroud is joined to the interior of an on-flying missile stage. A small rocket and fail-safe abutment ensure that the motor will be released in a direction opposite to the continuing flight path of the parent stage.

7 Claims, 4 Drawing Figures

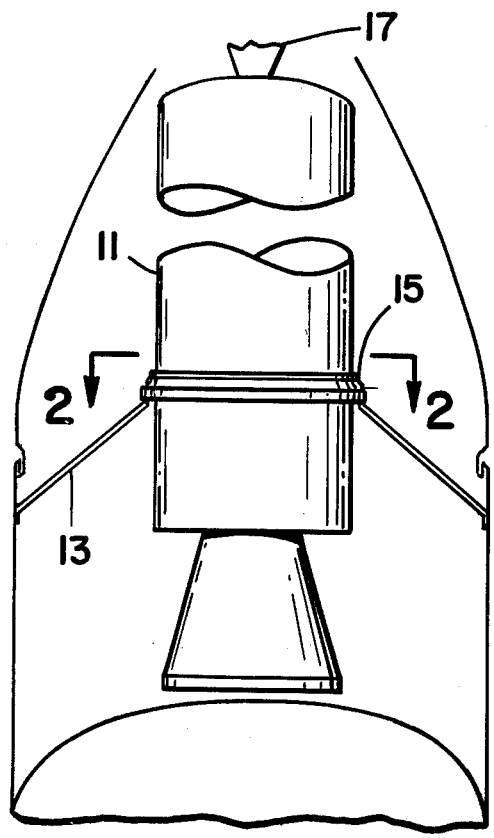
FIG_1
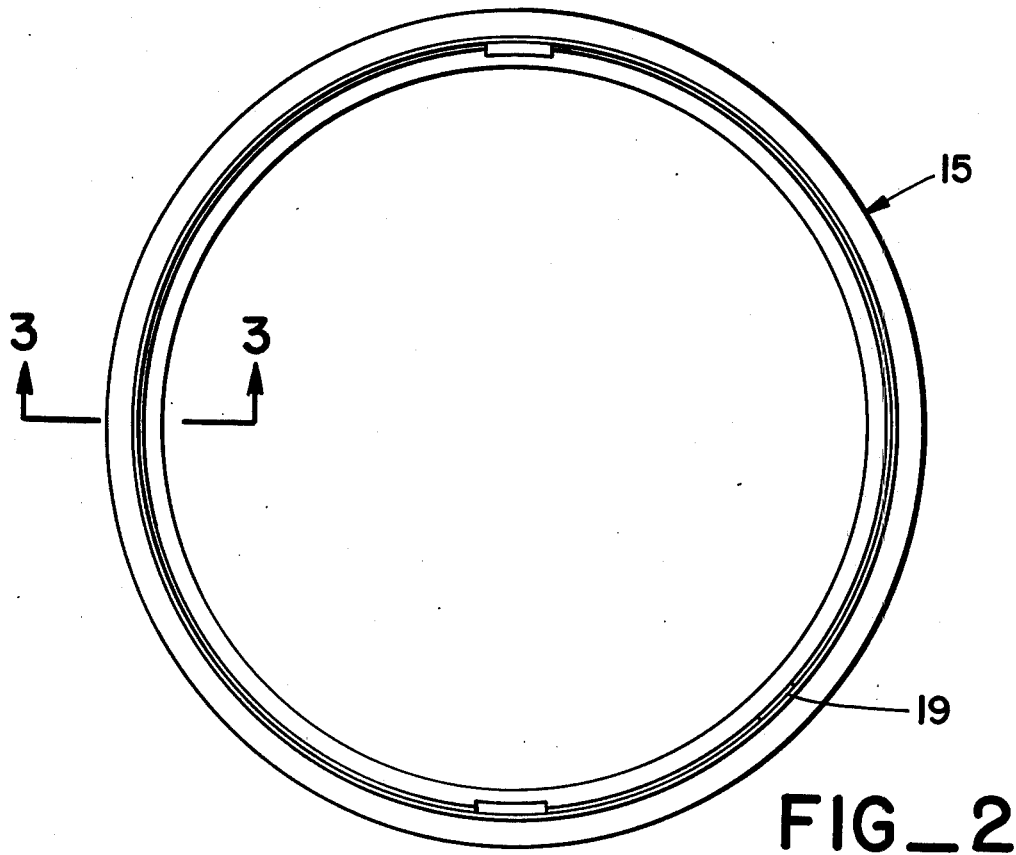
FIG_2

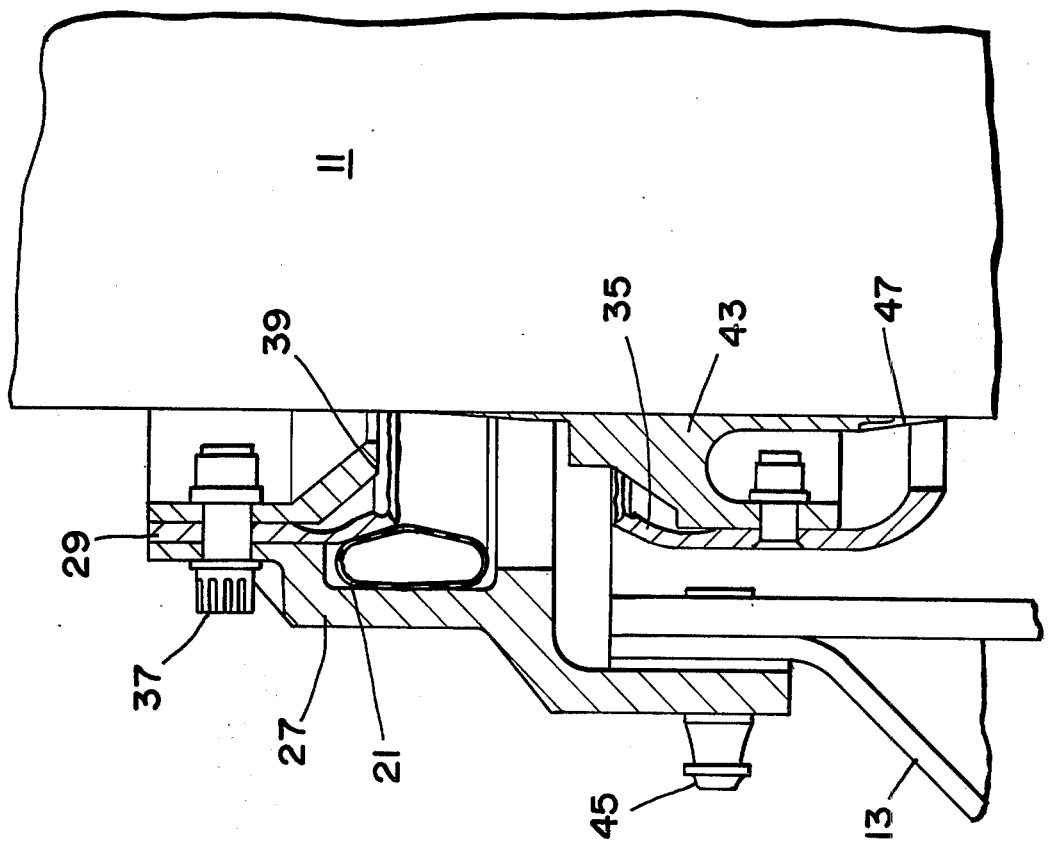
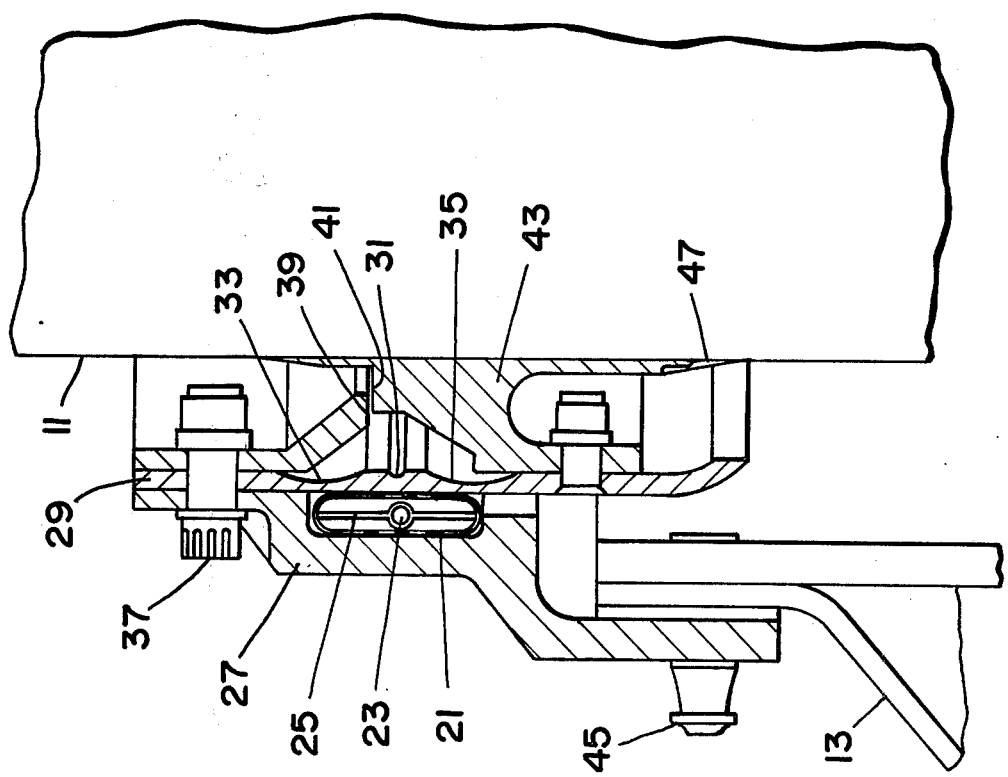

ROCKET ENGINE MOUNT

BACKGROUND OF THE INVENTION

1. Field of the Invention

The present invention relates to engine mountings. In particular, it relates to rocket engine mounting systems adapted to accommodate an engine positioned in the interior of an on-flying missile stage.

2. Description of the Prior Art

Upon burn-out, a missile rocket engine becomes dead weight. Commonly such an engine will be jettisoned from the on-flying portion of such a missile. Thus, the engine mounting arrangement must also provide a release capability.

Engine mounting systems are confronted with unique design problems when it is desired to position the engine interior to an on-flying missile stage. Such location has been necessitated by the development of concepts such as submarine-launched missiles. A new generation missile may be constrained in size for compatibility with an existing submarine missile tube. Design necessity may cause an engine, for instance, to be positioned within the payload and missile shroud.

An external or conventionally located engine is commonly surrounded by a segment of the surface skin of the missile and may be separated from the missile along with the surrounding skin as if it were a separate and independent missile stage. Such an engine faces separation problems common to all missile "stages". New problems are encountered when the non-degradation of the surrounding functional portions of a missile stage is necessary for the success of the missile. Devices which separate the engine from the on-flying stages by means of explosive cords, although thoroughly adequate in many conventional situations, are inadequate for internally-mounted motors due to the uncontrolled spreading of shrapnel associated with such a removal technique.

Additionally, the interior positioning of the rocket engine introduces substantial torsion problems. The typical rocket engine is elongated, having an axis that coincides with that of the missile in which it is mounted. Such an engine can weigh thousands of pounds, creating its own inertial force independent of the rest of the missile. When operated from a submarine, two types of lateral forces may be encountered, those due to depth charges and those due to relative movement of the submarine and the surrounding water medium upon underwater launch. These are new design problems due to the new capabilities of present-generation missiles.

The present invention provides both minimal torsional stress on the missile and effective and non-degrading motor release by providing a bracket located approximately at mid-length of the rocket motor engaging a motor-encircling joint having a groove and unsymmetrically weakened cross-section. Torsion is economically minimized by the shortened moment arm via mid-length attachment while the unsymmetrically weakened fracture joint does not introduce shrapnel into the missile body.

SUMMARY OF THE INVENTION

The present invention basically includes a bracket located approximately mid-length of the engine and wound thereon engaging an engine-encircling shroud having a grooved and unsymmetrically weakened cross-section. The shroud is joined to the interior of an on-flying missile stage. A small rocket and fail-safe abutment ensure that the motor will be released in a direction opposite to the continuing flight path of the parent stage.

STATEMENT OF THE OBJECTS OF THE INVENTION

An object of this invention is to provide a missile engine mounting system that will release the motor, upon burn-out, from an on-flying stage of the missile in which the motor has been internally positioned.

Another object of the invention is to provide a missile engine mounting system which will release an internally positioned engine only in a direction opposite to the continuing flight path of the missile.

Yet another object of this invention is to provide an engine mounting system for positioning an engine within a missile stage which will not degrade the missile upon release of the engine.

Still another object of this invention is to provide a missile engine mounting system which will minimize torsional stress at the junction of the engine to the missile stage.

Other objects, advantages and novel features of the invention will become apparent from the following detailed description of the invention when considered in conjunction with the accompanying drawings wherein:

BRIEF DESCRIPTION OF THE DRAWINGS

FIG. 1 depicts a rocket engine positioned within the interior of a missile in accordance with the present invention.

FIG. 2 is a frontal view of the separation ring of the present invention taken along line 2—2 of FIG. 1.

FIG. 3 is a side sectional view of the invention taken along line 3—3 of FIG. 2 before release of the engine.

FIG. 4 is a side sectional view of the invention taken along line 3—3 of FIG. 2 after release of the engine.

DESCRIPTION OF THE PREFERRED EMBODIMENT

Referring now to FIG. 1, there is shown a view of the present invention adapted for joining a rocket motor 11 to the interior structure 13 of an on-flying section of a missile. Such an arrangement might occur within the final stage of a missile in which the separation ring 15 to be described hereinafter is surrounded by portions of the missile warhead. A small rocket 17 is located at the top of the engine 11 and is positioned to produce a thrust force opposite to that of engine 11. Although FIG. 1 illustrates an engine located within the final stage of a missile, the present invention may be successfully practiced within initial or intermediate stages, also.

FIG. 2 is a frontal view of separation ring 15 taken along line 2—2 of FIG. 1. The assembly which comprises separation ring 15 is seen to be circular to accommodate an engine 11 of circular cross-section. Other accommodating geometries, as dictated by engine cross-section, are to be considered within the scope of the invention described herein. A port 19 is provided in the ring 15 for an electrical input device. The electrical input device communicates through port 19 with explosive mechanisms within separation ring 15 in the functioning of the present invention.

FIG. 3 shows the assembly before separation of the motor from the on-flying stage. After separation, a configuration as illustrated in FIG. 4 is achieved.

With particular reference to FIG. 3, a zip tube 21 of suitable material such as stainless steel is seen in which is contained an explosive charge 23. The charge and tube encircle the engine 11, the charge being suspended within the tube by rubber fin 25. The fin serves to center the explosive in the otherwise empty interior chamber of the zip tube 21. The material of the zip tube 21 is chosen in conjunction with the particular explosive charge 23 to allow a contained expansion of the tube as shown in FIG. 4. The explosive 23 is ignited upon receipt of an appropriate signal from the missile's systems, such as the interlock, by any of a number of conventional means not essential to the present inventive concept. Port 19 provides a means for mechanical linkage of the signal carrying conduit with explosive 23.

Zip tube 21 is located in a hollowed chamber formed by shroud 27 and fracture member 29. Its sidewalls abut against the sides of each. It is to be noted and essential to the concept of the present invention that the portion of shroud 27 abutting against zip tube 21 is of greater transverse dimension than the corresponding portion of fracture member 29 at groove 31. Indentations 33 and 35 also provide weakened portions of fracture member 29 essential to the present concept.

Bolt assembly 37 maintains the chamber for zip tube 21. Assembly 37 additionally joins a fail safe ring 39 to the encircling assembly. The ring 39 is positioned to abut against fail safe ridge 41 of bracket 43. Its purpose is to prevent the upward movement of motor casing 11 after joint fracture as illustrated in FIG. 4. Small rocket 17 provides a force in a direction reverse to the trajectory of the on-flying missile stage to further direct the engine opposite the continuing missile flight path. Because of the internal positioning of the engine it is critical that it be jettisoned away from the on-flying portions of the missile.

Bolt assembly 45 links the encircling joint to missile structure 13.

In operation, after fuel burn-out, a signal causes explosive charge 23 to ignite. Rubber fin 25 disintegrates and expanding gases released by the explosion exert great outward pressure uniformly throughout the encircling zip tube 21. The elongated sides of zip tube 21 assure that the greatest transverse force will be exerted against the sides, rather than the top and bottom, of the tube. The design of the chamber surrounding zip tube 21 assures that fracture will take place only at groove 31 and bending, as indicated in FIG. 4, at indentations 33 and 35. The greater thickness of the cross-section of the shroud 27 assures that expansion of the zip tube will be concentrated as indicated. Thus a predictable shrapnel-free "clean" break will occur at groove 31. Additionally, shroud 27, located between the surrounding missile interior and the zip tube 21 will cause any shrapnel generated by the expansion of zip tube 21 against a defective fracture member 29 to be directed solely toward the burned-out engine. On-flying missile stages are not degraded.

Upon fracture at groove 31, rocket 17 will impart a downward force on the head of motor casing 11, initiating the movement of the spent motor in a direction away from the on-flying missile stage.

Windings 47 enable the attachment of bracket 43 to engine 11 at the approximate mid-length of the engine. The windings 47 are preferably of fabric. Mid-joint attachment provides an economical means of minimizing the potential torsional force impulses to be encountered by the engine. Forces transverse to the length of such an engine may arise when a missile is operational in conjunction with a submarine carrier. They are due, principally, to depth charge attack and to undersea launch wherein the submarine launch tube is in motion relative to the fluid medium at the time of ejection.

Thus it is seen that there is achieved an engine mounting that achieves a clean break of a missile motor from an on-flying missile stage and economically minimizes the torsional forces encountered by such a mounting during undersea operation.

What is claimed is:

1. A system for mounting an engine within a missile comprising:
    (a) a hollow tube to encircle said engine;
    (b) an explosive contained in said tube;
    (c) a shroud joined to said missile, said shroud encircling said engine and having an identation at its interior to contain said tube therein;
    (d) a fracture member joined in the interior of said shroud, said fracture member encircling said engine and enclosing said indentation to form a chamber within which said tube is contained, said fracture member being of lesser transverse cross-section than said shroud and being attached to said shroud at its upper end and to said bracket at its lower end with an interior groove therebetween, and having a first internal indentation between said groove and said point of attachment to said shroud and a second indentation between said groove and said point of attachment to said bracket; and
    (e) a bracket joined to the exterior of said engine and to said fracture member.

2. A system as described in claim 1 wherein said system additionally comprises an encircling ring joined to said fracture member and having an inward protrusion so that said bracket will engage said ring upon upward movement of said engine relative to said missile thereby stopping said movement.

3. A bracket as described in claim 2 wherein said bracket has a shoulder to abut said ring.

4. A system as described in claim 3 wherein said system additionally comprises a propelling means which is activated upon fracture of said fracture member to propel said motor in a direction opposite to the continuing flight of said missile.

5. A bracket as described in claim 4 wherein said bracket is joined to said engine at the approximate mid-length of said engine.

6. A tube as described in claim 5 wherein said tube is of stainless steel.

7. A system as described in claim 6 wherein said system additionally comprises a web to support said explosive within said hollow tube.

* * * * *